Jan. 12, 1960  A. G. LAUTZENHISER  2,921,160
ELECTRIC SWITCH

Filed June 18, 1956  3 Sheets-Sheet 1

INVENTOR.
ARGYLE G. LAUTZENHISER
BY
John P. Marvin
ATTORNEY

Jan. 12, 1960 A. G. LAUTZENHISER 2,921,160
ELECTRIC SWITCH
Filed June 18, 1956 3 Sheets-Sheet 2

INVENTOR.
ARGYLE G. LAUTZENHISER
BY John T. Marvin
ATTORNEY

Jan. 12, 1960     A. G. LAUTZENHISER     2,921,160
ELECTRIC SWITCH

Filed June 18, 1956                                                   3 Sheets-Sheet 3

INVENTOR.
ARGYLE G. LAUTZENHISER
BY John P. Marvin
ATTORNEY

United States Patent Office 2,921,160
Patented Jan. 12, 1960

2,921,160
ELECTRIC SWITCH

Argyle G. Lautzenhiser, Anderson, Ind., assignor to General Motors Corporation, Detroit, Mich., a corporation of Delaware Application June 18, 1956, Serial No. 592,153

6 Claims. (Cl. 200—87)

This invention relates to electric switches and more particularly to an electric switch that is suitable for use in controlling the operation of a fluid suspension system in a motor vehicle.

It is an object of the present invention to provide a switch that is suitable for use as a wheel switch for a fluid suspension system of a motor vehicle.

Another object of the present invention is to provide a switch with a rotatable actuator which is arranged to vary the magnetic flux between an electromagnetic coil and the opposite sides of a flexible reed when the actuator is rotated in either direction from a neutral position.

A further object of the present invention is to provide a wheel switch with a minimum of parts which will be subject to wear. This object is accomplished by providing the switch with a rotatable actuator which through magnetic attraction will selectively cause the contacts in either one of a pair of circuits to be closed.

A still further object of the present invention is to control the flow of fluid in a fluid suspension system for a motor vehicle with a means that includes a wheel switch wherein the closing of the contacts in either one of a pair of circuits is accomplished by means of a rotatable magnetic actuator.

In carrying out the above objects it is another object of the present invention to include a damping means in the switch so the switch will be responsive to variations in height between the sprung and unsprung mass of the vehicles but will not be responsive to the high frequency variations therebetween which are caused by irregularities in the road.

In connection with the above objects it is a further object of the present invention to provide the switch according to the present invention with a snap acting contact arrangement which is responsive to the true variations in height between the sprung and unsprung mass of the vehicle and not to the false variations as caused by the irregularities in the road over which the vehicle is traveling.

Further objects and advantages of the present invention will be apparent from the following description, reference being had to the accompanying drawings, wherein a preferred embodiment of the present invention is clearly shown.

In the drawings:

Fig. 1 diagrammatically shows a fluid suspension system for a motor vehicle including the use of switches according to the present invention.

Figure 1:
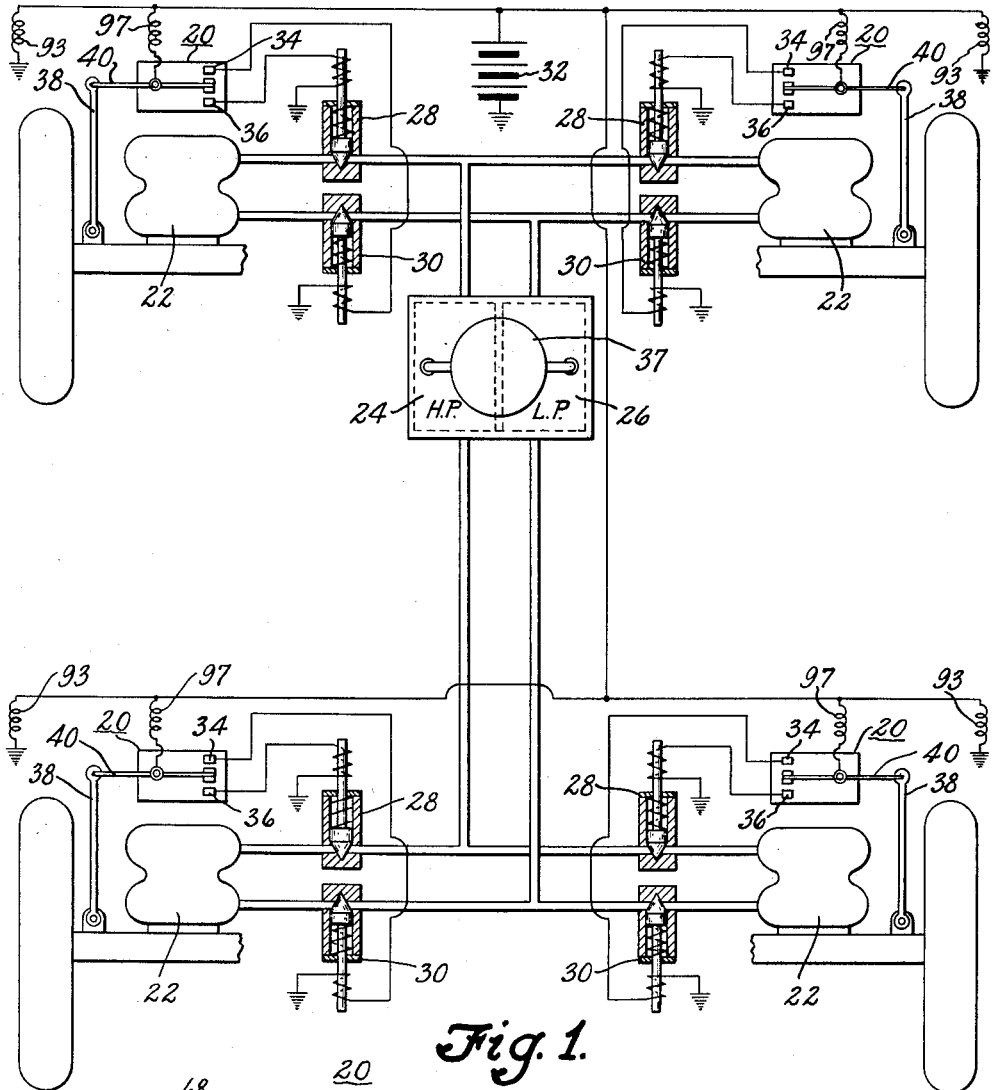

In the drawings the numeral 20 designates a switch according to the present invention. This switch is particularly adapted for use as a wheel switch on behicles having fluid suspension systems.

In fluid suspension systems of the type herein contemplated, a variable volume chamber is positioned between the sprung and unsprung mass of the vehicle. By way of explanation, the sprung mass generally includes the various parts of the vehicle such as the fenders and body which are carried on the unsprung mass which normally includes the vehicle's wheels, axles, etc. In the normal fluid suspension system a variable volume chamber such as the elastomeric bag 22, shown in Fig. 1, is positioned between the sprung and upsprung masses. The volume of this bag is varied through suitable control means to maintain a predetermined constant vertical distance between these masses. In the system shown in Fig. 1, the compressible fluid, which is preferably air, is used to control the volume of the variable chamber 22. In the particular embodiment shown the air is maintained under two different pressures in the high pressure chamber 24 and the lower pressure chamber 26. Each of the chambers 22 is connected through suitable conduits with chambers 24 and 26. These conduits are controlled by solenoid valves 28 and 30, respectively, which are energized from the battery 32 through the switch means 20 according to the present invention.

The switch according to the present invention has a pair of spaced stationary contacts 34 and 36. These contacts are connected in circuit with the coil windings of solenoids 28 and 30, respectively. Further, the switch is so arranged so only one of the solenoids may be energized at a time. Thus, if the variable air chamber 22 is not maintaining a proper vertical distance between the sprung and unsprung masses, the solenoid 28 will open and connect the high pressure chamber 24 with the variable chamber 22 to increase the volume of the variable chamber and thereby increase the distance between the sprung and unsprung mass. If on the other hand the chamber 22 is maintaining too great a distance between the sprung and unsprung masses, the solenoid valve 30 will open and the pressure from the variable chamber 22 will pass to the low pressure chamber. Obviously a predetermined pressure differential is maintained between the high pressure and low pressure chamber by a compressor 37.

In the present embodiment the actuation of the switch 20 is accomplished through levers 38 and 40 so that the opening and closing of the switch contacts will be responsive to the variations in height between the sprung and unsprung mass from a neutral position wherein neither of the switch contacts are closed.

Figure 2:
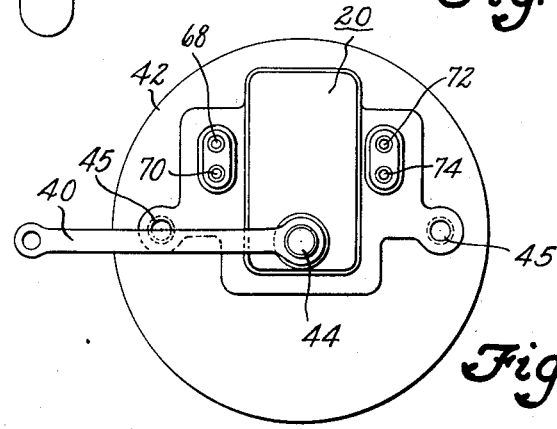
Fig. 2 is a bottom plan view of the switch according to the present invention.

In Fig. 2 of the drawings it will be seen that the switch 20 includes a switch housing 42 which journals the shaft 44 on which the lever 40 is suitably secured. The switch 20, if desired, may include suitable threaded holes 45 for securing the switch to the sprung mass of the vehicle so the switch will be in a neutral or open circuit position when the proper distance exists between the sprung and unsprung masses.

Figure 3:
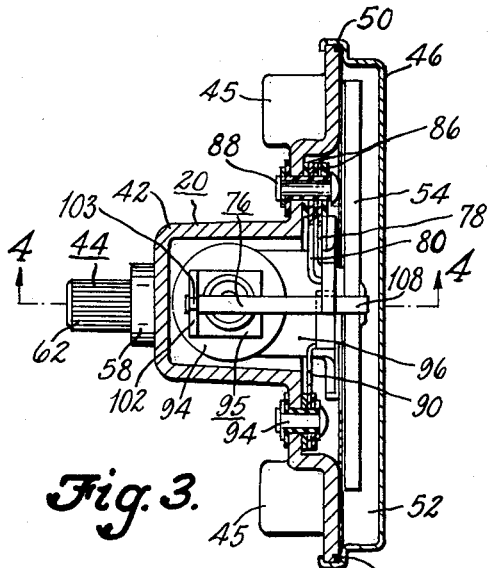
Fig. 3 is a side view partly in section of the switch shown in Fig. 2.
Figure 4:
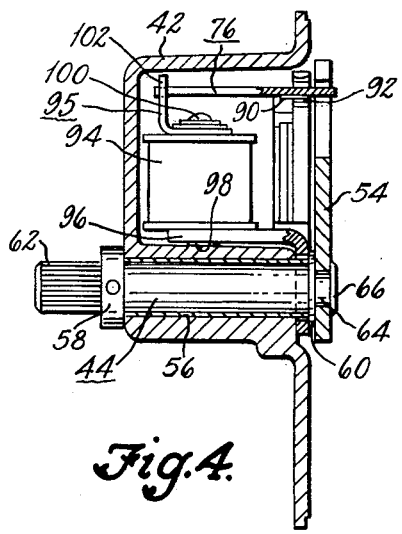
Fig. 4 is a sectional view taken along line 4—4 in Fig. 3 with the switch cover removed.

In Fig. 3 of the drawings the switch housing 42 is provided with a cover 46 which is sealingly attached to the cover by means of an annular seal 48 when the periphery of the cover 50 is turned over the periphery of the housing. This cover 46 provides an enclosed chamber 52 within which a rotatable magnetic actuator 54, which will be hereinafter described, is maintained. The shaft 44 is journalled on the housing 42 through a bearing 56 and is maintained in position by thrust collars 58 and 60. The end 62 of the shaft 44 which extends exterior to the housing 42 is preferably splined as shown so that the lever 40 may be positioned thereon. The end of the shaft 64 which is contained within chamber 52 is preferably reduced in size so that the rotatable disc 54 may be secured thereon when the end of the shaft is riveted over as at 66. As clearly seen in Fig. 2 of the drawings the switch includes four terminal posts: 68, 70, 72 and 74. While these terminals may be connected in any suitable fashion to the internal parts of the switch, in the embodiment shown, terminal 68 is connected with the movable reed 76 which will be hereinafter described, and terminal 70 is preferably connected through the solenoid coil windings, which will be also hereinafter described, to ground. The terminals 72 and 74 are connected with a pair of contacts 34 and 36.

Figure 6:
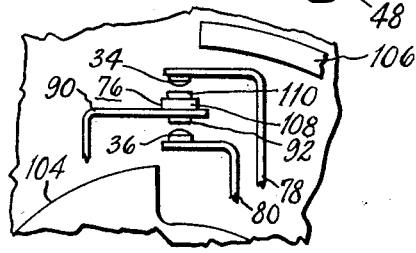
Fig. 6 is an enlarged view showing the arrangement of the switch contacts when the rotatable actuator is in a neutral position.
Figure 7:
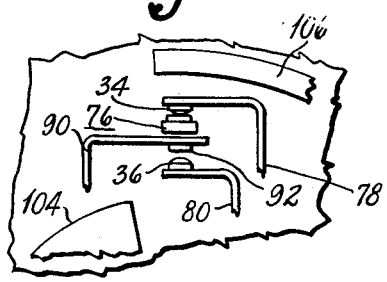
Fig. 7 is an enlarged view of the switch parts in Fig. 6 showing the arrangement of the contacts when the magnetic actuator is rotated in one direction from the neutral position.
Figure 8:
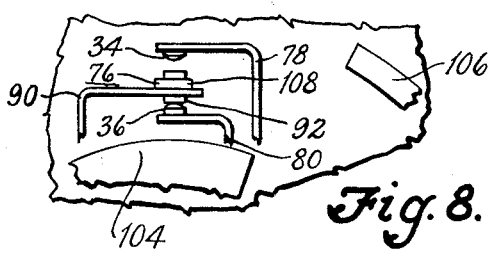
Fig. 8 is an enlarged view of the switch parts in Fig. 7 showing the arrangement of the contacts when the actuator is rotated in the opposite direction from the neutral position.

The supports 78 and 80 for the stationary contacts 34 and 36, respectively, are secured to the housing by rivets 88 and insulated from each other by members 86. The support 90 for the contact 92 is secured to the housing by the rivet 94. The supports 78 and 80 are arranged so the stationary contacts 34 and 36 are spaced from each other with the reed 76 and the contact 92 on support 90 positioned therebetween as shown in Figs. 6–8.

The electromagnetic coil 94 which may be of any suitable construction is positioned within the housing by a member 96. This member 96 is preferably L-shaped and has one end apertured and secured to the housing by screws (not shown) to surround the end of shaft 44. The other end of the member 96 is also apertured so the core of the coil winding may be secured thereto as by riveting the end of the core at 98. Secured on the opposite end 100 of the coil winding core is a support 95 for reed member 76. This support 95 has a notched end 102 which receives a T-shaped end 103 on reed 76. The notches 102 are arranged with the T-shaped end 103 to provide a hinge connection so the reed may move between the contacts. This reed 76 may also be formed of flexible magnetic material if desired. In this case the notches 102 will hold the reed rigid so the reed may move between the contacts as it flexes for the purposes which will be hereinafter apparent.

Figure 5:
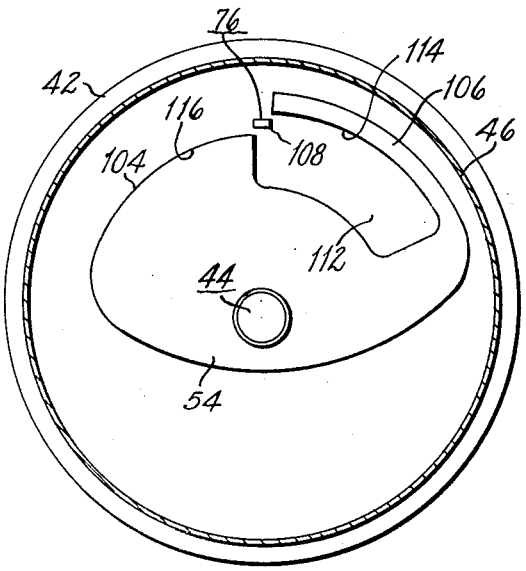
Fig. 5 is a plan view of the rotatable magnetic actuator disc or cam as seen in the switch housing with the switch cover removed.

The periphery of disc member 54 is provided with space curved portions 104 and 106 as shown in Fig. 5. This disc member 54 is formed magnetic metal and is secured to be rotatable with shaft 44. When the disc member 54 is in the neutral position shown in Fig. 5, portions 104 and 106 will be equidistantly spaced from the end 108 of the reed 76 which projects between the portions 104 and 106. When the disc member 54 is in this position, the magnetic flux which passes between the reed 76 and the portions 104 and 106 from the electromagnet 94 will be substantially equal and the position of reed 76 will not be changed. When the disc 54 is rotated counterclockwise, portion 106 will be brought into close proximity with the end 108 of the reed while the main body of the disc will be at a substantial distance from the end 108. When this occurs, the reed 108 will be attracted to the portion 106 as shown in Fig. 7 to cause engagement between the contact 110 as carried on the end 108 of the reed and the stationary contact 34. Conversely when the disc is rotated in the clockwise direction portion 104 will be brought into close proximity to the reed end 108. This will cause the reed end 108 to move the support 90 which carries the contact 92 so that engagement is formed between the contact 92 and stationary contact 36 to complete electric circuit therebetween.

Further from Fig. 5 of the drawings it is apparent that the disc 54 is formed so the portion 106 is provided by the extending tongue which is spaced from the main disc body by a cutout portion 112. This extending tongue is arranged so that its inner edge 114 is radially spaced from the outer edge 116 of portion 104 and is circumferentially spaced by a distance corresponding to the width of the portion 108 plus the width of the desired air gaps between 108 and the two curved surfaces 114 and 116. The curvature of the edges 114 and 116 preferably is such that the edges 114 and 116 are defined by radial arcs from the center of the shaft 44, although this latter feature is not necessary for the success of the present invention. Further it is to be appreciated that a small movement of the disc 54 in either the counter or clockwise direction will cause the reed 76 to be moved so that an engagement occurs between a stationary and movable contact. Further, if the disc is moved a substantial number of degrees beyond the point at which the contacts engage each other, the pressure between the contacts will not be increased. This arrangement will permit the switch to be connected to the wheel of the vehicle where it will permit a wide degree of movement to occur between the sprung and unsprung portions of the vehicle without damage to the switch parts.

The electromagnetic coil 94, which has been previously described, preferably is provided with two coil windings 93 and 97. These windings may be circuited as shown in Fig. 1 so winding 93 acts as a shunt winding to provide continuous magnetomotive force for the actuation of reed 76. The other winding 97 is connected in series with the intended load represented by the windings of solenoids 28 and 30. Thus whenever the circuit through contacts 34 or 36 is completed, the contact pressure is increased from the resulting increase of the field created by the series winding 97. This will assure a firm electrical connection in spite of road vibrations of the vehicle. Conversely upon the opening of the circuit through contacts 34 and 36 a rapid separation will occur resulting from the decrease in field strength by the opening of the circuit to the series winding 97. Thus the series winding 97 when used in connection with the shunt winding 93 gives the effect of a snap acting switch.

Figure 9:
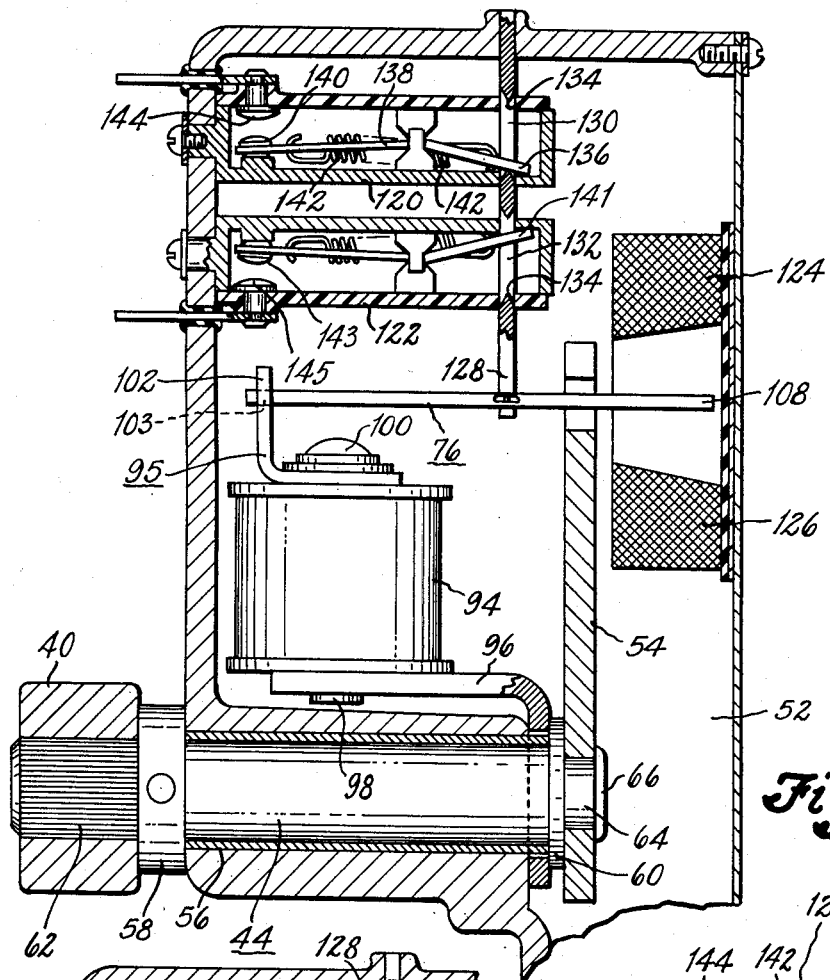
Fig. 9 shows a modification of the switch in Figs. 1–8 wherein the switch includes normally open snap acting contacts and a means for reducing the vibratory and rapid acting movements of the reed.
Figure 11:
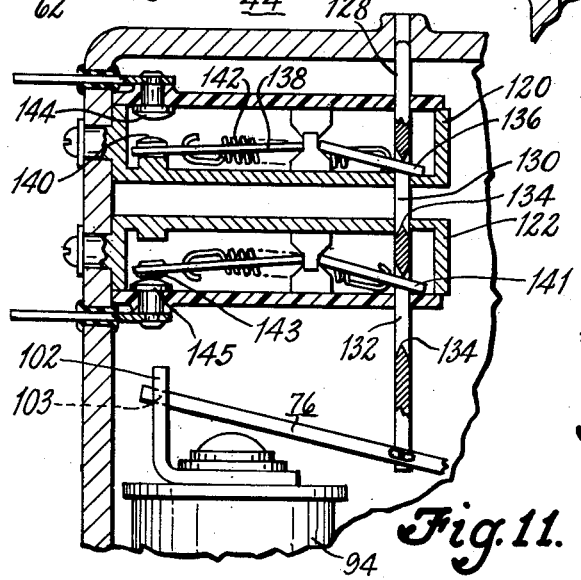
Fig. 11 shows the arrangement of the contacts in the switch in Fig. 9 wherein the actuator is moved in the opposite direction in Fig. 10.
Figure 10:
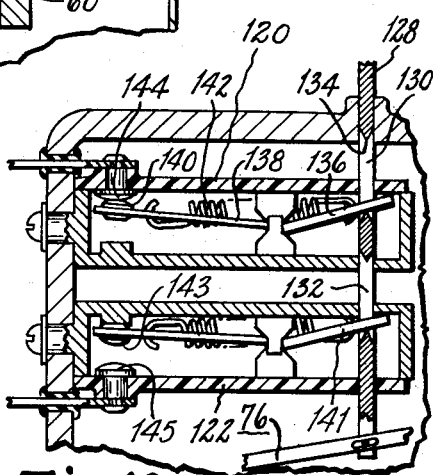
Fig. 10 shows the arrangement of the contacts in the switch in Fig. 9 wherein the reed actuator is moved in one direction.

In Figs. 9, 10 and 11 of the drawings, a switch according to the present invention is provided with snap-acting contacts 120 and 122 and a means 124 which will retard the vibration of the reed 76 of the switch. The remaining components of the switch, such as the shaft, the electromagnetic coil, the rotating disc, etc., are the same as described in the preceding embodiment.

In this embodiment the reed 76 will be made to move either up or down through the action of disc 54 when it is rotated as has been previously described. The motion of this reed in responding to the movement of the disc is retarded by the electromagnetic coil 126 which generates a magnetic flux field. Thus whenever the reed is moved through the action of disc 54, the extending portion 108 which has been considerably elongated over the embodiment shown in Figs. 1–8 cuts the magnetic lines of flux which are generated by the electromagnetic coil 126. This will cause the movement of the reed to be considerably retarded so that the switch will not tend to respond to the irregularities of the road as the height between the sprung and unsprung masses changes with a high frequency. The switch however will respond whenever the distance between the sprung and unsprung masses of the vehicle is varied from the neutral position for periods sufficient to require leveling. When this occurs, the disc 54 will cause the reed 76 to move in spite of the retarded action accomplished by the coil winding 126 either up or down as shown in Fig. 9. Thus when the reed 76 is moved upwardly from the neutral position as shown in Fig. 10 the actuating member 128, which has one end slidable in the switch housing and the other end secured to reed 76 will cause the switch 120 to move from the open circuit position to the closed circuit position while the switch 122 remains in the open circuit position. This movement of the switches is accomplished as clearly shown in the drawings. When however the reed member 76 is moved from the neutral position in the downward direction, the actuator 128 will cause the switch 120 to remain in the open circuit position and move the contacts of switch 122 with a snap action to the closed circuit position. While any suitable snap acting mechanism may be employed in the switch shown, in the embodiment shown, the member 128 is provided with spaced slots 130 and 132 which are formed to have spaced knife edges 134 which are located as shown. When the actuator 128 is moved from the position shown in Fig. 9 to the position shown in Fig. 10 the bottom knife edge 134 of slot 130 will cause the actuator member 136 of switch 120 to be moved upwardly and above the center line of the contact carrier 138 on which the movable contact 140 is carried. When the actuator 136 thus moves past the center line of carrier 138, the spring 142 will cause the carrier 138 to move upwardly with a snap action so contact 140 moves into engagement with the stationary contact 144. While this movement occurs the actuator 141 of switch 122 will not be moved because of the length of the slot 132. When the actuator 128 is moved downwardly, the above procedure will be reversed, that is, the actuator 136 of switch 120 will not be moved because of the length of the slot 130. On the other hand the upper knife edge 134 of slot 132 will engage and move the actuator 141 to cause the movement of contact 143 so that it will engage the stationary contact 145 of switch 122. These snap acting contacts have been found desirable in switches of this type particularly where the switch controls the energization of a solenoid coil winding. It it to be further appreciated that switches of the type herein contemplated will be required to operate millions of cycles during the life of the vehicle to which the switch is attached. Further the switches must control a highly inductive circuit. These circuits frequently cause arcing of the contacts and when a snap action is utilized in switches of this character, the contact life of the switches is considerably increased if the circuit is rapidly made and broken.

While the embodiment of the present invention as herein disclosed, constitutes a preferred form, it is to be understood that other forms might be adopted.

What is claimed is as follows:

1. An electric switch for controlling actuation of a vehicle fluid suspension system, comprising a pair of spaced stationary contacts, a flexible reed of magnetic material having a free end normally extending between and spaced from said contacts and movable from the normal position into engagement with either of said contacts, an electromagnetic coil, and a disc member of magnetic material rotatable between predetermined limits in either direction from a neutral position, said disc member having a pair of edges spaced equidistantly on opposite sides of said reed when said reed and disc are in said neutral position and arranged so the spacing between one of said edges and reed is substantially less than the spacing between the reed and other edge when the disc is rotated in one direction from said neutral position and the spacing between the other of said edges and said reed is substantially less than the spacing between the reed and said one edge when the disc is rotated in the other direction from said neutral position.

2. In an electric switch the combination comprising; a switch housing, a pair of spaced snap acting contacts carried by said housing, a member of magnetic material having one end carried by said housing and a movable end normally connected with said contacts for selectively actuating either of said contacts when the movable end of said member is moved from a neutral position, a means for moving the movable end of said member including an electromagnetic coil and a rotatable member of magnetic material constructed to provide a variable air gap for the flux flowing from said coil between opposite sides of the movable end of said member and the rotatable magnetic member as said member is rotated from a neutral position, and a means for reducing the effect of said rotatable member on said flexible member.

3. In an electric switch the combination comprising; a switch housing, a rotatable shaft and a pair of spaced stationary contacts carried by said housing, a flexible member of magnetic material having one end carried by said housing and a free end extending between and normally spaced from said stationary contacts and arranged to be engageable with either of said stationary contacts when said member is flexed from its normal position, and a means for flexing said member including; a magnetic coil and a member of magnetic material rotatable with said shaft and arranged to vary the magnetic flux between said coil and opposite sides of said flexible member and a means for increasing the magnetic flux of said coil when the flexible member engages either of the stationary contacts.

4. In an electric switch the combination comprising; a switch housing, a rotatable shaft and a pair of spaced stationary contacts carried by said housing, a flexible member of magnetic material having one end carried by said housing and a free end extending between and normally spaced from said stationary contacts and arranged to be engageable with either of said stationary contacts when said member is flexed from its normal position, a means for flexing said member including; a magnetic flux generating coil, a member of magnetic material rotatable with said shaft and arranged to vary the magnetic flux generated by said coil on opposite sides of said flexible member, a means for reducing the rate of flexure of said member and a means for increasing the flux of said coil after the flexible member engages either of the stationary contacts.

5. In an electric switch the combination comprising; a switch housing, a rotatable shaft and a pair of spaced stationary snap acting contacts carried by said housing, a flexible member of magnetic material having one end carried by said housing and a free end extending between and normally spaced from said stationary contacts and arranged to be engageable with either of said stationary contacts when said member is flexed from its normal position, a means for flexing said member including; a magnetic flux generating coil and a member of magnetic material rotatable with said shaft arranged to vary effect of the magnetic flux between said coil and opposite sides of said flexible member and a means for reducing the rate of flexure of said member.

6. An electric switch comprising, a pair of spaced contacts, a movable member formed of magnetic material having a free end normally extending between and spaced from said contacts and movable from the normal position into engagement with either of said contacts, an electromagnetic coil, and an actuating member of magnetic material movable between predetermined limits in either direction from a neutral position, said actuating member having a pair of edges spaced from opposite sides of said movable member when said movable member and actuating member are in said neutral position and arranged so the spacing between one of said edges and movable member is substantially less than the spacing between the movable member and the other edge when the actuating member is moved in one direction from said neutral position, and the spacing between the other of said edges and said movable member is substantially less than the spacing between the movable member and said one edge when the actuating member is moved in the other direction from said neutral position.

References Cited in the file of this patent

UNITED STATES PATENTS

| | | |
|---|---|---|
| 2,112,098 | Johnson | Mar. 22, 1938 |
| 2,119,450 | Trautner | May 31, 1938 |
| 2,298,068 | Pierce | Oct. 6, 1942 |
| 2,303,952 | Pfleger | Dec. 1, 1942 |
| 2,401,347 | Hansen | June 4, 1946 |
| 2,423,586 | Decker | July 8, 1947 |
| 2,762,633 | Gouirand | Sept. 11, 1956 |
| 2,809,051 | Jackson | Oct. 8, 1957 |